(12) United States Patent
Matsuzaki et al.

(10) Patent No.: US 9,170,411 B2
(45) Date of Patent: Oct. 27, 2015

(54) SCANNING OPTICAL MICROSCOPE

(71) Applicant: Panasonic Intellectual Property Management Co., Ltd., Chuo-ku, Osaka-shi (JP)

(72) Inventors: Keiichi Matsuzaki, Kyoto (JP); Teruhiro Shiono, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/483,161

(22) Filed: Sep. 11, 2014

(65) Prior Publication Data
US 2015/0103352 A1 Apr. 16, 2015

(30) Foreign Application Priority Data
Oct. 11, 2013 (JP) .................................. 2013-213431

(51) Int. Cl.
*G02B 21/00* (2006.01)
(52) U.S. Cl.
CPC ........ *G02B 21/0032* (2013.01); *G02B 21/0052* (2013.01)
(58) Field of Classification Search
CPC ........... G02B 21/0032; G02B 21/0052; G01N 21/55; G01N 2021/558
USPC ........................ 359/368, 370, 371, 385, 386
See application file for complete search history.

(56) References Cited

U.S. PATENT DOCUMENTS 5,496,995 A * 3/1996 Kato et al. .................... 250/216

FOREIGN PATENT DOCUMENTS

JP 2001-091848 4/2001

* cited by examiner

*Primary Examiner* — Frank Font
(74) *Attorney, Agent, or Firm* — Greenblum & Bernstein, P.L.C.

(57) ABSTRACT

A scanning optical microscope includes a light source; a first beam splitter that splits light into irradiation light and reference light; a first objective lens that converges the irradiation light on a sample and receives signal light; a second beam splitter that splits the signal light off from an optical path; a pin hole positioned on an optical path of the split signal light at a position optically conjugate with an image-forming point of the first objective lens; a condenser lens that converges the split signal light on the pin hole; a phase plate that outputs first light including at least four firstly-split beams having different phases; a third beam splitter that multiplexes the first light and second light to generate interfering light including at least four secondly-split beams having different phases; and a light detecting element that receives the interfering light and outputs at least four electric signals.

23 Claims, 8 Drawing Sheets

SCANNING OPTICAL MICROSCOPE

BACKGROUND OF THE INVENTION

1. Field of the Invention

The disclosure relates to scanning optical microscopes.

2. Description of the Related Art

A confocal scanning microscope including a scanning unit to avoid irregular illumination during scanning is known to date (see Japanese Unexamined Patent Application Publication No. 2001-91848).

SUMMARY OF THE INVENTION

However, the structure of the above-described existing scanning microscope requires a large high-sensitivity detector, such as a photomultiplier, in order to highly sensitively obtain a reflected image of a sample because the amount of signal light reflected off the sample is extremely small. Thus, size reduction of the existing structure has been difficult. In other words, providing a compact high-sensitivity scanning optical microscope has been difficult.

One non-limiting and exemplary embodiment provides a compact high-sensitivity scanning optical microscope.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

In one general aspect, the techniques disclosed here feature: a scanning optical microscope that includes a light source; a first beam splitter configured to split light emitted from the light source into irradiation light and reference light; a first objective lens configured to converge the irradiation light on a sample and receive signal light, which occurs as a result of reflecting the converged light off the sample; a second beam splitter configured to split the signal light off from an optical path extending between the light source and the sample; a pin hole positioned on an optical path of the split signal light at a position optically conjugate with an image-forming point of the first objective lens; a condenser lens configured to converge the split signal light on the pin hole; a phase plate configured to output first light including at least four firstly-split light beams having different phases; a third beam splitter configured to multiplex the first light and second light to generate interfering light including at least four secondly-split light beams having different phases; and a light detecting element configured to receive the interfering light and output at least four electric signals, wherein the at least four firstly-split light beams correspond to the at least four secondly-split light beams, wherein the intensities of the at least four electric signals respectively correspond to the intensities of the at least four secondly-split light beams, wherein a first phase plate or a second phase plate is used as the phase plate, wherein, when the first phase plate is used as the phase plate, the reference light enters the first phase plate and the signal light that has passed through the pin hole serves as the second light, and wherein, when the second phase plate is used as the phase plate, the signal light that has passed through the pin hole enters the second phase plate and the reference light serves as the second light.

A scanning optical microscope disclosed herein can achieve high sensitivity and size reduction.

DESCRIPTION OF THE PREFERRED EMBODIMENTS

Background Findings

Figure 1:
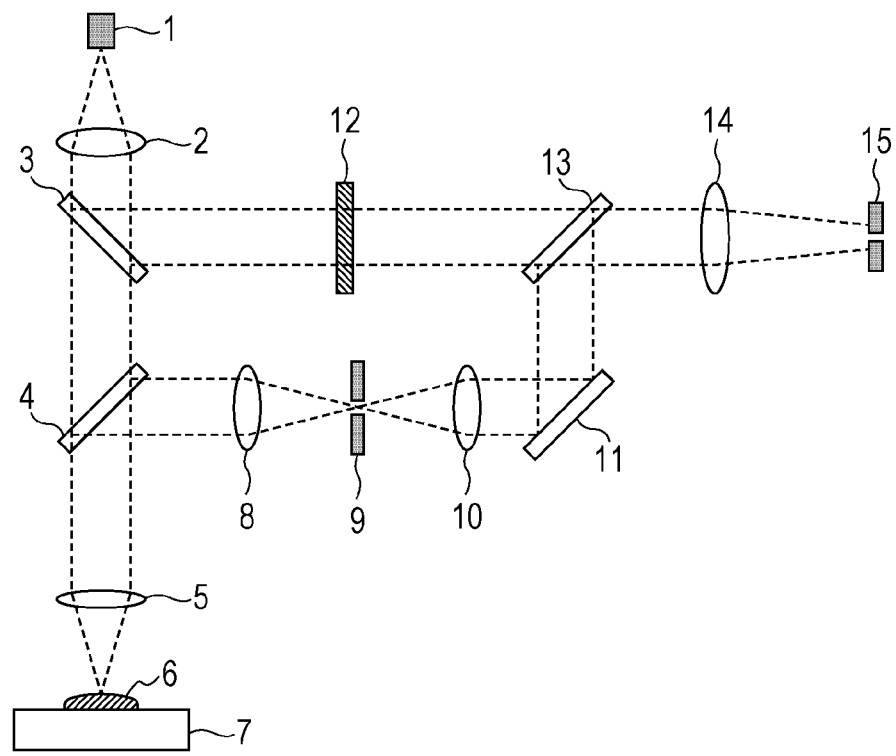
FIG. 1 illustrates the entire configuration of an optical system of a scanning optical microscope according to a first embodiment of the disclosure.

Scanning optical microscopes obtain an image of a sample by converging light, such as laser beams, using an objective lens, applying a light spot of the light to a sample while scanning the sample, detecting the intensity of transmitted light that has been transmitted through the sample or reflected light that has been reflected off the sample, and performing image processing on the light.

A large number of scanning optical microscopes that are currently commercially available have a confocal optical system in which a pin hole is positioned at a point in front of a detector at which reflected light from a laser beam spot applied to a sample is converged.

In the confocal optical system, a light source, a sample, and a pin-hole surface are all positioned at positions conjugate with one another. Thus, light from a surface of a sample on which the converged light is focused is transmitted through a pin hole and is received by a detector. On the other hand, light from a surface of a sample on which the converged light is not focused spreads over the surface in which the pin hole is formed, fails to pass through the pin hole, and is thus negligibly received by the detector.

The confocal optical system can thus exclude unnecessary light scattered from portions other than the focal plane of the objective lens and thus can significantly improve the image resolving power and the contrast of the obtained image.

In the confocal optical system, not only the in-plane resolution improves, but also the resolution in the depth direction of the sample improves due to a reduction of the focal depth. By three-dimensionally moving the sample and the objective lens relative to each other, information of the sample in the depth direction can be obtained with high resolution as a change of light quantity. The obtained information of the sample in the depth information can be combined by a computer into a three-dimensional image of the sample.

Methods for scanning a sample by a scanning optical microscope applying a light spot to the sample can be divided into two methods: a method for scanning a sample by moving a stage on which a sample is mounted while the convergent position of a laser beam is fixed; and a method for scanning a sample by polarizing a laser beam.

Examples of the method for scanning a sample by polarizing a laser beam include the following methods: a method for mechanically changing the direction of a laser beam using a polygon mirror or a galvanometer mirror that rotates at high speed; and a method for polarizing a laser beam by causing electric signals to change the refractive index of an ultrasonic deflection element, an electro-optic deflection element, or the like. With such methods, the sample can be scanned with a laser spot at the converged point by converging a polarized laser light flux with the objective lens.

In addition, a method for scanning a sample using, instead of the pin hole, a Nipkow disk having a large number of holes has been practically used in order to immediately obtain an image of measured materials.

An example of existing confocal scanning microscopes is disclosed in Japanese Unexamined Patent Application Publication No. 2001-91848. A configuration of the existing confocal scanning microscope is described below with reference to FIG. 11.

Figure 11:
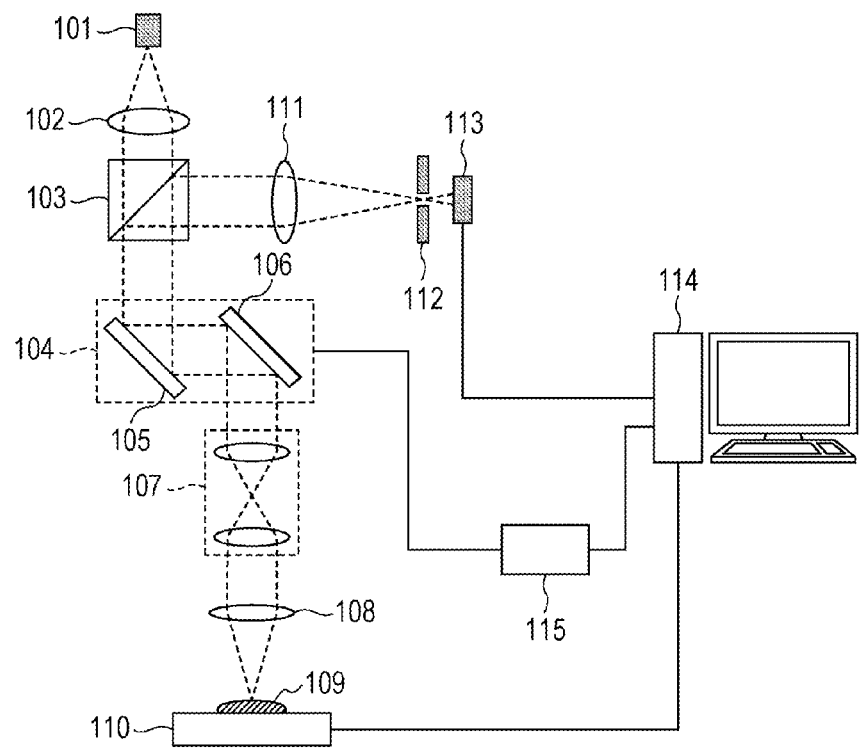
FIG. 11 schematically illustrates the entire configuration of an optical system of an existing scanning optical microscope.

As illustrated in FIG. 11, light from a laser light source 101 is collimated by a collimation lens 102 into parallel light. The light then passes through a beam splitter 103 and enters a scanning unit 104 including a pair of mirrors 105 and 106, which are perpendicular to the rotation axis direction.

The scanning unit 104 polarizes light in two directions perpendicular to the optical axis of the laser beams by moving the mirrors 105 and 106 using a motor or an oscillator, not illustrated, in response to a signal from a rotation controlling device 115.

Parallel light that has passed through the scanning unit 104 becomes parallel light again by being transmitted through a relay lens 107 and is then converged on a sample 109 by an objective lens 108 to form a light spot.

The relay lens 107 is positioned at such a position that the center of rotation of light polarized by the scanning unit 104 is conjugate with the pupil position of the objective lens 108 so that the light polarized by the scanning unit 104 enters the objective lens 108.

Reflected light from the light spot on the sample 109 is converged again by the objective lens 108 and inversely travels along the optical path of the irradiation light. After being transmitted through the relay lens 107, the reflected light is transmitted through the scanning unit 104, reflected by the beam splitter 103, and converged by the detector lens 111 on a pin hole 112.

An image of the light spot on the sample 109 is formed at the converged point on the pin hole 112. Only the image of the light spot on the sample 109 can pass through the pin hole 112 and is received by the light detecting device 113.

In synchronization with the scanning of the scanning unit 104, the light detecting device 113 receives reflected light from the sample and converts the intensity of the reflected light into electric signals and the information processing device 114 combines the electric signals. Thus, a two-dimensional image of the sample 109 can be obtained.

Since light reflected from portions other than the light spot on the sample 109 forms an image at a position displaced from the pin hole 112, such light negligibly arrives at the light detecting device 113.

The confocal scanning microscope illustrated in FIG. 11 thus can observe a sample with not only a high lateral resolution but also a high longitudinal resolution (resolution in the depth direction).

In addition, the confocal scanning microscope can not only observe a sample with light reflected off the sample but also observe a sample using a light detecting device 113 by causing fluorescence or scattered light that has occurred in a region of a sample 109 irradiated with irradiation light to pass through the pin hole 112.

By using the high longitudinal resolution of the confocal scanning microscope, a sample 109 can be three-dimensionally observed by obtaining a two-dimensional image every time the sample stage 110 is vertically moved.

The existing technology, however, fails to provide a compact, reasonable reflection-mode scanning optical microscope that can highly sensitively obtain a reflected image of a sample or a compact, reasonable transmission-mode scanning optical microscope that can highly sensitively obtain a transmitted image of a sample.

The microscope disclosed in Japanese Unexamined Patent Application Publication No. 2001-91848 enables observation of a sample using a reflected image of the sample obtained with a high resolution by detecting signal light reflected off the sample and converting the reflected light intensity into an electric signal.

The above-described existing technology, however, is almost incapable of highly sensitively obtaining a reflected image of a sample because the amount of signal light reflected off the sample is extremely small relative to the amount of light applied to the sample.

In the case, for example, where living cells are observed, the difference in refractive index between cytoplasm and a cell nucleus is smaller than or equal to 0.01 and the reflectance is thus as small as 0.0013% or smaller, whereby distinguishing between cytoplasm and a cell nucleus has been extremely difficult.

To address this situation, the existing confocal microscope includes a high-sensitivity detector such as a photomultiplier to receive faint signal light reflected off a sample. A photomultiplier is a type of vacuum tube and disadvantageous because of a large element size and a high price. In the case where a microscope system includes such a high-sensitivity detector, the system cannot have a small size nor be provided at a low price.

The amount of signal light can be increased by increasing the amount of light applied to a sample. However, in the case where a living cell is observed, an increase of the amount of light applied to the sample may damage the living cell. Thus, the increase of the amount of light is limitative.

An scanning optical microscope according to an aspect of the disclosure includes a light source; a first beam splitter configured to split light emitted from the light source into irradiation light and reference light; a first objective lens configured to converge the irradiation light on a sample and receive signal light, which occurs as a result of reflecting the converged light off the sample; a second beam splitter configured to split the signal light off from an optical path extending between the light source and the sample; a pin hole positioned on an optical path of the split signal light at a position optically conjugate with an image-forming point of the first objective lens; a condenser lens configured to converge the split signal light on the pin hole; a phase plate configured to output first light including at least four firstly-split light beams having different phases; a third beam splitter configured to multiplex the first light and second light to generate interfering light including at least four secondly-split light beams having different phases; and a light detecting element configured to receive the interfering light and output at least four electric signals, wherein the at least four firstly-split light beams correspond to the at least four secondly-split light beams, wherein intensities of the at least four electric signals correspond one to one to intensities of the at least four secondly-split light beams, wherein a first phase plate or a second phase plate is used as the phase plate, wherein, when the first phase plate is used as the phase plate, the reference light enters the first phase plate and the signal light that has passed through the pin hole serves as the second light, and wherein, when the second phase plate is used as the phase plate, the signal light that has passed through the pin hole enters the second phase plate and the reference light serves as the second light.

Thus, the intensity of signal light can be amplified by interfering reference light and signal light reflected off a sample with each other. As a result, a reflected image of the sample can be highly sensitively obtained.

Since the microscope can highly sensitively obtain faint signal light reflected off the sample, an existing light-receiving element, such as a photodiode, can highly sensitively detect a signal having a high signal-to-noise ratio from the sample having a small reflectance. As a result, the microscope dispenses with a large, expensive high-sensitivity light detecting element, such as a photomultiplier, thereby achieving reduction in size and price.

Consequently, a compact, reasonable reflection-mode scanning optical microscope that can highly sensitively obtain a reflected image of a sample can be provided.

In the scanning optical microscope, the at least four firstly-split light beams may include i) a first split light beam that has passed through a first split area; ii) a second split light beam that has passed through a second split area and that has a phase shifted by 90 degrees from a phase of the first split light beam; iii) a third split light beam that has passed through a third split area and that has a phase shifted by 180 degrees from the phase of the first split light beam; and iv) a fourth split light beam that has passed through a fourth split area and that has a phase shifted by 270 degrees from the phase of the first split light beam.

Thus, four beams of interfering light having different phases can be easily generated.

In the scanning optical microscope, the light detecting element may include i) a first photoreceptive surface configured to receive a first interfering light beam corresponding to the first split light beam, ii) a second photoreceptive surface configured to receive a second interfering light beam corresponding to the second split light beam, iii) a third photoreceptive surface configured to receive a third interfering light beam corresponding to the third split light beam, and iv) a fourth photoreceptive surface configured to receive a fourth interfering light beam corresponding to the fourth split light beam, and wherein the at least four secondly-split light beams includes the first interfering light, the second interfering light, the third interfering light, and the fourth interfering light.

The first to fourth interfering light beams can thus be respectively received by the first to fourth photoreceptive surfaces independently of one another. The quality of electric signals output from the first to fourth photoreceptive surfaces can thus be prevented from being reduced due to crosstalk between the first to fourth interfering light beams.

In the scanning optical microscope, the light detecting element may have the first photoreceptive surface, the second photoreceptive surface, the third photoreceptive surface, and the fourth photoreceptive surface on the same plane.

Thus, the first to fourth photoreceptive surfaces can be integrated together on a flat substrate. Moreover, this configuration dispenses with an adjustment of relative positions of the photoreceptive surfaces and facilitates an assembly and an adjustment of the scanning optical microscope.

The scanning optical microscope may further include a first signal processor configured to obtain a difference between a signal value output from the first photoreceptive surface and a signal value output from the third photoreceptive surface; a second signal processor configured to obtain a difference between a signal value output from the second photoreceptive surface and a signal value output from the fourth photoreceptive surface; and a third signal processor configured to output a square root of a sum of squares of a signal value output from the first signal processor and a signal value output from the second signal processor.

This configuration enables detection of a reflected image of a low-reflectance sample in the case where the phase of signal light from the sample or the phase of the reference light is changed.

A scanning optical microscope according to another aspect of the disclosure includes a light source; a first beam splitter configured to split light emitted from the light source into irradiation light and reference light; a first objective lens configured to converge the irradiation light on a sample; a second objective lens configured to receive signal light that has been converged on the sample and transmitted through the sample; a second beam transmitter configured to change an optical path of the signal light; a pin hole positioned on the changed optical path of the signal light at a position optically conjugate with an image-forming point of the first objective lens; a condenser lens configured to converge the signal light, whose optical path has been changed, on the pin hole; a phase plate configured to output first light including at least four firstly-split light beams having different phases; a third beam splitter configured to multiplex the first light and second light to generate interfering light including at least four secondly-split light beams having different phases; and a light detecting element configured to receive the interfering light and output at least four electric signals, wherein the at least four firstly-split light beams correspond to the at least four secondly-split light beams, wherein the intensities of the at least four electric signals correspond one to one to intensities of the at least four secondly-split light beams, wherein a first phase plate or a second phase plate is used as the phase plate, wherein, when the first phase plate is used as the phase plate, the reference light enters the first phase plate and the signal light that has passed through the pin hole serves as the second light, and wherein, when the second phase plate is used as the phase plate, the signal light that has passed through the pin hole enters the second phase plate and the reference light serves as the second light.

This configuration enables highly sensitively obtaining faint signal light from a sample. Thus, a signal having a high signal-to-noise ratio can be highly sensitively detected by an existing light-receiving element, such as a photodiode, from a sample having a low transmittance. Thus, this configuration dispenses with a large, expensive, high-sensitivity light detecting element, such as a photomultiplier, and achieves a compact, reasonable device.

Consequently, a compact, reasonable transmission-mode scanning optical microscope capable of highly sensitively obtaining a transmitted image of a sample can be provided.

In the scanning optical microscope, the phase plate may output the first light after splitting the first light into i) a first split light beam that has passed through a first split area; ii) a second split light beam that has passed through a second split area and that has a phase shifted by 90 degrees from a phase of the first split light beam; iii) a third split light beam that has passed through a third split area and that has a phase shifted by 180 degrees from the phase of the first split light beam; and iv) a fourth split light beam that has passed through a fourth split area and that has a phase shifted by 270 degrees from the phase of the first split light beam.

Thus, four beams of interfering light having different phases can be easily generated.

In the scanning optical microscope, the light detecting element may include i) a first photoreceptive surface configured to receive a first interfering light beam corresponding to the first split light beam, ii) a second photoreceptive surface configured to receive a second interfering light beam corresponding to the second split light beam, iii) a third photoreceptive surface configured to receive a third interfering light beam corresponding to the third split light beam, and iv) a fourth photoreceptive surface configured to receive a fourth interfering light beam corresponding to the fourth split light beam, and wherein the at least four secondly-split light beams includes the first interfering light, the second interfering light, the third interfering light, and the fourth interfering light.

The first to fourth interfering light beams can thus be respectively received by the first to fourth photoreceptive surfaces independently of one another. The quality of electric signals output from the first to fourth photoreceptive surfaces can thus be prevented from being reduced due to crosstalk between the first to fourth interfering light beams.

In the scanning optical microscope, the light detecting element may have the first photoreceptive surface, the second photoreceptive surface, the third photoreceptive surface, and the fourth photoreceptive surface on the same plane.

Thus, the first to fourth photoreceptive surfaces can be integrated together on a flat substrate. Moreover, this configuration dispenses with an adjustment of relative positions of the photoreceptive surfaces and facilitates an assembly and an adjustment of the scanning optical microscope.

The scanning optical microscope may also include a first signal processor configured to obtain a difference between a signal value output from the first photoreceptive surface and a signal value output from the third photoreceptive surface; a second signal processor configured to obtain a difference between a signal value output from the second photoreceptive surface and a signal value output from the fourth photoreceptive surface; and a third signal processor configured to output a square root of a sum of squares of a signal value output from the first signal processor and a signal value output from the second signal processor.

This configuration enables detection of a reflected image of a low-reflectance sample in the case where the phase of signal light from the sample or the phase of the reference light is changed.

A scanning optical microscope according to another aspect of the disclosure includes a light source; a first beam splitter configured to split light emitted from the light source into irradiation light and reference light; a first objective lens configured to converge the irradiation light on a sample and receive signal light, which occurs as a result of reflecting the converged light off the sample; a second beam splitter configured to split the signal light off from an optical path extending between the light source and the sample; a pin hole positioned on an optical path of the split signal light at a position optically conjugate with an image-forming point of the first objective lens; a condenser lens configured to converge the split signal light on the pin hole; an optical splitting element configured to multiplex the split signal light that has passed through the pin hole and the reference light, and split the multiplexed light into a first light flux and a second light flux; a half-wavelength plate configured to change a direction of polarization of the first light flux; a first polarization beam splitter configured to split the first light flux that has passed through the half-wavelength plate into a first interfering light beam and a third interfering light beam having a phase shifted by 180 degrees with respect to a phase of the first interfering light beam; a quarter-wavelength plate configured to change a direction of polarization of the second light flux; a second polarization beam splitter configured to split the second light flux that has passed through the quarter-wavelength plate into a second interfering light beam, having a phase shifted by 90 degrees with respect to the phase of the first interfering light beam, and a fourth interfering light beam, having a phase shifted by 270 degrees with respect to the phase of the first interfering light beam; a first light detecting element configured to receive the first interfering light beam and output a first electric signal corresponding to the intensity of the first interfering light beam; a second light detecting element configured to receive the second interfering light beam and output a second electric signal corresponding to the intensity of the second interfering light beam; a third light detecting element configured to receive the third interfering light beam and output a third electric signal corresponding to the intensity of the third interfering light beam; and a fourth light detecting element configured to receive the fourth interfering light beam and output a fourth electric signal corresponding to the intensity of the fourth interfering light beam.

Thus, four beams of interfering light having different phases can be easily generated.

In the scanning optical microscope, the light detecting element may include i) a first photoreceptive surface configured to receive the first interfering light beam; ii) a second photoreceptive surface configured to receive the second interfering light beam; iii) a third photoreceptive surface configured to receive the third interfering light beam; and iv) a fourth photoreceptive surface configured to receive the fourth interfering light beam.

The first to fourth interfering light beams can thus be respectively received by the first to fourth photoreceptive surfaces independently of one another. The quality of electric signals output from the first to fourth photoreceptive surfaces can thus be prevented from being reduced due to crosstalk between the first to fourth interfering light beams.

The scanning optical microscope may further include a first signal processor configured to obtain a difference between a signal value output from the first photoreceptive surface and a signal value output from the third photoreceptive surface; a second signal processor configured to obtain a difference between a signal value output from the second photoreceptive surface and a signal value output from the fourth photoreceptive surface; and a third signal processor configured to output a square root of a sum of squares of a signal value output from the first signal processor and a signal value output from the second signal processor.

This configuration enables detection of a reflected image of a low-reflectance sample in the case where the phase of signal light from the sample or the phase of the reference light is changed.

A scanning optical microscope according to another aspect of the disclosure includes a light source; a first beam splitter configured to split light emitted from the light source into irradiation light and reference light; a first objective lens configured to converge the irradiation light on a sample; a second objective lens configured to receive signal light that has been converged on the sample and transmitted through the sample; a second beam splitter configured to change an optical path of the signal light that has passed through the second objective lens, the optical path extending between the light source and the sample; a pin hole positioned on the changed optical path of the signal light at a position optically conjugate with an image-forming point of the first objective lens; a condenser lens configured to converge the signal light, whose optical path has been changed, on the pin hole; an optical splitting element configured to multiplex the signal light that has passed through the pin hole and the reference light, and split the multiplexed light into a first light flux and a second light flux; a half-wavelength plate configured to change a direction of polarization of the first light flux; a first polarization beam splitter configured to split the first light flux that has passed through the half-wavelength plate into a first interfering light beam and a third interfering light beam having a phase shifted by 180 degrees with respect to a phase of the first interfering light beam; a quarter-wavelength plate configured to change a direction of polarization of the second light flux; a second polarization beam splitter configured to split the second light flux that has passed through the quarter-wavelength plate into a second interfering light beam, having a phase shifted by 90 degrees with respect to the phase of the first interfering light beam, and a fourth interfering light beam, having a phase shifted by 270 degrees with respect to the phase of the first interfering light beam; a first light detecting element configured to receive the first interfering light beam and output a first electric signal corresponding to an intensity of the first interfering light beam; a second light detecting element configured to receive the second interfering light beam and output a second electric signal corresponding to an intensity of the second interfering light beam; a third light detecting element configured to receive the third interfering light beam and output a third electric signal corresponding to an intensity of the third interfering light beam; and a fourth light detecting element configured to receive the fourth interfering light beam and output a fourth electric signal corresponding to an intensity of the fourth interfering light beam.

Thus, four beams of interfering light having different phases can be easily generated.

In the scanning optical microscope, the light detecting element may include i) a first photoreceptive surface configured to receive the first interfering light beam; ii) a second photoreceptive surface configured to receive the second interfering light beam; iii) a third photoreceptive surface configured to receive the third interfering light beam; and iv) a fourth photoreceptive surface configured to receive the fourth interfering light beam.

The first to fourth interfering light beams can thus be respectively received by the first to fourth photoreceptive surfaces independently of one another. The quality of electric signals output from the first to fourth photoreceptive surfaces can thus be prevented from being reduced due to crosstalk between the first to fourth interfering light beams.

The scanning optical microscope may further include a first signal processor configured to obtain a difference between a signal value output from the first photoreceptive surface and a signal value output from the third photoreceptive surface; a second signal processor configured to obtain a difference between a signal value output from the second photoreceptive surface and a signal value output from the fourth photoreceptive surface; and a third signal processor configured to output a square root of a sum of squares of a signal value output from the first signal processor and a signal value output from the second signal processor.

This configuration enables detection of a reflected image of a low-reflectance sample in the case where the phase of signal light from the sample or the phase of the reference light is changed.

A scanning optical microscope according to another aspect of the disclosure includes a light source; a first objective lens configured to converge irradiation light emitted from the light source on a sample and receive signal light, which occurs as a result of reflecting the converged light off the sample; a beam splitter disposed on an optical path extending between the light source and the sample and configured to output reference light by splitting the irradiation light emitted from the light source off in a first direction and split the reflected signal light off in a second direction, which is opposite to the first direction; a reflection mirror configured to reflect the split reference light to cause the reflected split reference light to pass through the beam splitter and propagate in the second direction; a pin hole positioned on an optical path of the split signal light at a position optically conjugate with an image-forming point of the first objective lens; a condenser lens configured to converge the reflected split reference light and the split signal light on the pin hole; an optical splitting element configured to multiplex the reflected split reference light that has passed through the pin hole and the signal light that has passed through the pin hole, and split the multiplexed light into a first light flux and a second light flux; a half-wavelength plate configured to change a direction of polarization of the first light flux; a first polarization beam splitter configured to split the first light flux that has passed through the half-wavelength plate into a first interfering light beam and a third interfering light beam, having a phase shifted by 180 degrees with respect to a phase of the first interfering light beam; a quarter-wavelength plate configured to change a direction of polarization of the second light flux; a second polarization beam splitter configured to split the second light flux that has passed through the quarter-wavelength plate into a second interfering light beam, having a phase shifted by 90 degrees with respect to the phase of the first interfering light beam, and a fourth interfering light beam, having a phase shifted by 270 degrees with respect to the phase of the first interfering light beam; a first light detecting element configured to receive the first interfering light beam and output a first electric signal corresponding to an intensity of the first interfering light beam; a second light detecting element configured to receive the second interfering light beam and output a second electric signal corresponding to an intensity of the second interfering light beam; a third light detecting element configured to receive the third interfering light beam and output a third electric signal corresponding to an intensity of the third interfering light beam; and a fourth light detecting element configured to receive the fourth interfering light beam and output a fourth electric signal corresponding to an intensity of the fourth interfering light beam.

In this configuration, the reference light is also caused to pass through the pin hole. Thus, an aberration component or noise light included in the reference light can be removed at the pin hole, whereby the coherence of the reference light can be improved.

In the scanning optical microscope, the light detecting element may include i) a first photoreceptive surface configured to receive the first interfering light beam; ii) a second photoreceptive surface configured to receive the second interfering light beam; iii) a third photoreceptive surface configured to receive the third interfering light beam; and iv) a fourth photoreceptive surface configured to receive the fourth interfering light beam.

The first to fourth interfering light beams can thus be respectively received by the first to fourth photoreceptive surfaces independently of one another. The quality of electric signals output from the first to fourth photoreceptive surfaces can thus be prevented from being reduced due to crosstalk between the first to fourth interfering light beams.

The scanning optical microscope may further include a first signal processor configured to obtain a difference between a signal value output from the first photoreceptive surface and a signal value output from the third photoreceptive surface; a second signal processor configured to obtain a difference between a signal value output from the second photoreceptive surface and a signal value output from the fourth photoreceptive surface; and a third signal processor configured to output a square root of a sum of squares of a signal value output from the first signal processor and a signal value output from the second signal processor.

This configuration enables detection of a reflected image of a low-reflectance sample in the case where the phase of signal light from the sample or the phase of the reference light is changed.

The scanning optical microscope may further include a spot scanning device configured to scan the sample with a microscopic spot.

This configuration enables combining images of a sample into a two-dimensional image or a three-dimensional image.

In the scanning optical microscope, the spot scanning device may be a motorized stage, and image information of the sample may be obtained by changing relative positions of the sample and the microscopic spot as a result of the motorized stage two-dimensionally or three-dimensionally moving the sample.

This configuration enables combining images of a sample into a two-dimensional image or a three-dimensional image.

In the scanning optical microscope, the spot scanning device may be any one of a galvanometer scanner, an acousto-optic element, and an electro-optic element, and image information of the sample may be obtained by two-dimensionally scanning the sample with the microscopic spot as a result of changing an inclination of an optical axis of the irradiation light.

This configuration enables combining images of a sample into a two-dimensional image without vibrating the sample.

In the scanning optical microscope, the light source may be any one of a laser, a super luminescent diode, a light emitting diode, and a halogen lamp.

Hereinbelow, embodiments of the disclosure will be described with reference to the drawings.

First Embodiment

FIG. 1 illustrates the configuration of an example of a scanning optical microscope according to a first embodiment of the disclosure.

As illustrated in FIG. 1, light emitted from the laser light source 1 is collimated by a collimation lens 2 into parallel light and the light is divided into irradiation light transmitted through a first beam splitter 3 and reference light reflected off the first beam splitter 3.

The irradiation light is applied to a sample 6 by a first objective lens 5 and forms a convergence spot.

The signal light reflected from the convergence spot on the sample 6 is reflected by the second beam splitter 4 and converged by a first lens 8. Then, the signal light is transmitted through a pin hole 9 formed at the converged point of the first lens 8 and is collimated into parallel light again by a second lens 10.

The pin hole 9 is positioned at a position optically conjugate with an image-forming point on the sample 6 at which the first objective lens 5 forms an image. The pin hole 9 excludes components scattered from portions other than the laser-beam focal point on the sample and thus significantly improves the image resolving power and the contrast.

The pin hole 9 also excludes optical aberration of signal light reflected from the convergence spot.

For example, signal light includes aberration that occurs due to design tolerance or a production error of optical components such as the first objective lens 5 and the first lens 8 or spherical aberration that occurs due to the variance in thickness of the sample 6.

Such aberration appears in the form of light-amount distribution at a portion around the light spot of light converged at the pin hole 9. Thus, by excluding light at a portion around the light spot, aberration of light that passes through the pin hole 9 can be excluded and thus the wave front precision of signal light can be improved. As a result, the coherence of signal light can be improved.

The reference light reflected by the first beam splitter 3, on the other hand, passes through the phase plate 12. Thereafter, the reference light and the signal light collimated by the second lens 10 into parallel light are multiplexed by an optical multiplexing element 13.

The interfering light formed by multiplexing the reference light and the signal light is guided to a light detecting element 15 by an imaging lens 14.

Figure 2:
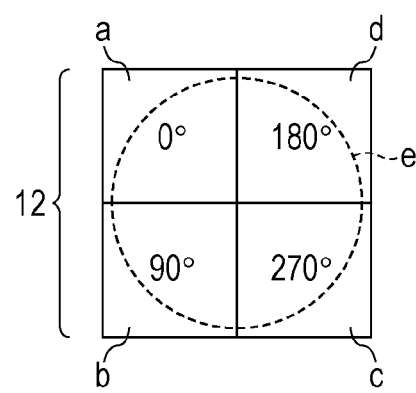
FIG. 2 illustrates the configuration of a phase plate according to the first embodiment of the disclosure.

Here, the phase plate 12 is configured to generate multiple beams of interfering light having different phases. For example, the configuration illustrated in FIG. 2 is preferable. In FIG. 2, the phase plate 12 is divided into four areas a, b, c, and d. In FIG. 2, the direction toward the plane of FIG. 2 is defined as a direction in which the reference light travels and the reference symbol e denotes the light flux of the reference light. A portion of the light flux that passes through the area a of FIG. 2, a portion of the light flux that passes through the area b of FIG. 2, a portion of the light flux that passes through the area c of FIG. 2, and a portion of the light flux that passes through the area d of FIG. 2 have different phases.

Among the entire light flux of the reference light, the portion of the light flux that passes through the area b of FIG. 2 has the phase advanced by 90 degrees with respect to the portion of the light flux that passes through the area a. Similarly, the portion of the light flux that passes through the area c of FIG. 2 has the phase advanced by 270 degrees with respect to the portion of the light flux that passes through the area a. Similarly, the portion of the light flux that passes through the area d of FIG. 2 has the phase advanced by 180 degrees with respect to the portion of the light flux that passes through the area a.

The phase plate 12 can be formed by disposing transparent films having different thicknesses over the areas a, b, c, and d of FIG. 2 on the surface of a transparent substrate such as glass.

Figure 3:
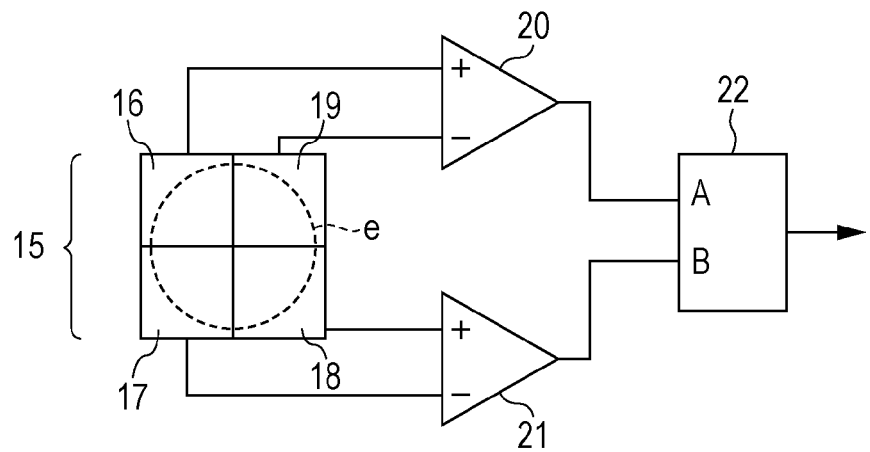
FIG. 3 illustrates the configuration of a light detecting element and a signal processing device according to the first embodiment of the disclosure.

The multiple beams of interfering light having different phases generated by being transmitted through the phase plate 12 are received by the light detecting element 15 and the light detecting element 15 outputs an electric signal. For example, the configuration illustrated in FIG. 3 is preferable. The reference symbol e in FIG. 3 denotes the light flux of interfering light obtained by multiplexing the signal light and the reference light converged by the imaging lens 14 of FIG. 1. The light detecting element 15 illustrated in FIG. 3 receives the portions of reference light that have passed through the four respective areas a, b, c, and d of the phase plate 12 illustrated in FIG. 2 in such a manner that these portions are respectively received by a first photoreceptive surface 16, a second photoreceptive surface 17, a third photoreceptive surface 18, and a fourth photoreceptive surface 19, which are illustrated in FIG. 3.

For example, the light detecting element 15 is adjusted in the following manner. Light is emitted by the laser light source 1 illustrated in FIG. 1 and only the reference light is caused to enter the light detecting element 15 while the entire reflected light from the mirror 11 is intercepted by a shielding plate. Subsequently, the areas b and d of the phase plate 12 illustrated in FIG. 2 are shaded by shielding plates. Then, the position of the light detecting element 15 is adjusted such that each signal output from the second photoreceptive surface 17 and the fourth photoreceptive surface 19 is maximized and each signal output from the first photoreceptive surface 16 and the third photoreceptive surface 18 is minimized. The position of the light detecting element is adjusted, with reference to the optical axis of the reference light, in the horizontal direction, vertical direction, rotation direction, and optical axis direction. The adjustment is completed by finally removing the shielding plates placed over the areas b and d of the phase plate 12. A similar adjustment may be performed by shading the areas a and c of the phase plate 12 instead of the areas b and d of the phase plate 12.

In the above-described configuration, a large amplitude of an electric signal can be obtained from a low-reflectance sample, whereby a reflected image of the low-reflectance sample can be highly sensitively detected.

In addition, a constant signal can be stably and reliably obtained even in the case where the phase of the signal light or the reference light is changed.

This mechanism is specifically described in detail below.

The intensity of reference light that enters the optical multiplexing element 13 illustrated in FIG. 1 is denoted by $I_r$ and the intensity of the signal light collimated by the second lens 10 into parallel light is denoted by $I_s$. The intensities of the interfering light beams that enter the respective photoreceptive surfaces of the light detecting element 15 illustrated in FIG. 3 are denoted by $I_1$, $I_2$, $I_3$, and $I_4$ and expressed as follows.

$$I_1 = \frac{1}{8}\{I_s + I_r + 2\sqrt{I_s I_r}\cos(\Phi)\} \tag{1}$$

$$I_2 = \frac{1}{8}\left\{I_s + I_r + 2\sqrt{I_s I_r}\cos\left(\Phi + \frac{1}{2}\pi\right)\right\} \tag{2}$$

$$I_3 = \frac{1}{8}\{I_s + I_r + 2\sqrt{I_s I_r}\cos(\Phi + \pi)\} \tag{3}$$

$$I_4 = \frac{1}{8}\left\{I_s + I_r + 2\sqrt{I_s I_r}\cos\left(\Phi + \frac{3}{2}\pi\right)\right\} \tag{4}$$

Here, ϕ denotes the phase of the interfering light beam having the intensity $I_1$ and is determined by the difference in length between the optical paths of the signal light and the reference light from the light source. Here, for the sake of simplicity, a laser beam is assumed to be a fully coherent beam. The splitting ratio at the optical multiplexing element is set at 1:1.

For the sake of simplicity, the quantum efficiency of each photoreceptive surface of the light detecting element 15 is defined as one and the amplification factor of a first signal arithmetic unit 20 and a second signal arithmetic unit 21 is defined as one.

The first signal arithmetic unit 20 outputs a difference Sig1 between electric signals from the first photoreceptive surface 16 and the fourth photoreceptive surface 19. The second signal arithmetic unit 21 outputs a difference Sig2 between electric signals from the third photoreceptive surface 18 and the second photoreceptive surface 17. Thus, from Expression (1) to Expression (4), the output from the first signal arithmetic unit 20 and the output from the second signal arithmetic unit 21 are expressed by Expression (5) and Expression (6) as follows.

$$Sig1 = \frac{1}{2}\sqrt{I_s I_r}\cos(\Phi) \tag{5}$$

$$Sig2 = \frac{1}{2}\sqrt{I_s I_r}\sin(\Phi) \tag{6}$$

A third signal arithmetic unit 22 outputs Sig3, which is the square root of the sum of the squares of the outputs from the first signal arithmetic unit 20 and the second signal arithmetic unit 21. From Expression (5) and Expression (6), the output Sig3 is expressed by Expression (7) as follows.

$$Sig3 = \frac{1}{2}\sqrt{I_s I_r} \tag{7}$$

In an existing confocal microscope, the reference light is rarely used. Thus, only the signal light is received by the light detecting element and the output Sig0 of the electric signal in this case is $I_s$.

Thus, the amplification factor Sig3/Sig0 of electric signals of the signal light amplified by the scanning optical microscope according to this embodiment is expressed by Expression (8) as follows.

$$Sig3/Sig0 = \frac{1}{2}\sqrt{I_r/I_s} \tag{8}$$

For example, $I_r$ in Expression (8) is assumed to be 1. If the reflectance of a sample is R, $I_s$ in Expression (8) is R/4 and thus Expression (8) is expressed by Expression (9) as follows.

$$Sig3/Sig0 = \sqrt{1/R} \tag{9}$$

For example, in the case where the reflectance of a sample is 0.01%, R=0.0001. Thus, from Expression (9), the amplification factor is multiplied 100-fold. Accordingly, the scanning optical microscope according to this embodiment can obtain, from a low-reflectance sample, an electric signal amplitude 100 times as large as that in the case of an existing scanning optical microscope. Thus, the scanning optical microscope according to this embodiment can highly sensitively detect a reflected image of a low-reflectance sample.

As described above, the phase ϕ in Expression (1) to Expression (6) is determined by the difference in length between optical paths of the signal light and the reference light. The difference in length between the optical paths, however, is variable due to scanning with a beam spot, vibrations, or a change in temperature of the optical system.

Even in the case where the phase of the signal light or the reference light is changed, a constant signal can be stably and reliably obtained since the parameter of the phase ϕ is cancelled with the calculation in Expression (7).

Reflected images of the sample are obtained by, for example, obtaining electric signals from the third signal arithmetic unit 22 while moving the sample stage 7 in the horizontal direction using a scanning device, not illustrated.

The images of the sample are then combined by an image processing device, not illustrated, and finally provided to an image output device, such as a television monitor, on which a microscopic image of the sample is displayed.

A three-dimensional image of the sample 6 can be obtained by vertically scanning the sample 6 using a device that can adjust the height of the sample 6, the device not being illustrated.

The spot scanning device may be any one of a galvanometer scanner, an acousto-optic element, and an electro-optic element.

Image information of the sample may be obtained by two-dimensionally scanning the sample with the microscopic spot as a result of changing an inclination of an optical axis of the irradiation light.

In this embodiment, a laser light source is used as the light source, but this is not the only example. Examples of the light source include a light bulb, a super luminescent diode, a light emitting diode, a halogen lamp, and a light source that emits infrared light.

In this embodiment, the phase plate 12 is disposed on the optical path of the reference light. However, the phase plate 12 may be disposed on the optical path of the signal light at a position at which the signal light has not yet been multiplexed by the optical multiplexing element 13.

In this embodiment, signal light from portions other than the focal point is excluded by the pin hole 9. However, this is not the only way of excluding unnecessary signal light. For example, a slit or an optical fiber may be disposed instead of the pin hole 9 to exclude signal light from portions other than the focal point.

The scanning optical microscope according to the embodiment is an erect-image microscope but may be an inverted-image microscope such as a biological microscope.

The phase plate 12 includes the areas a, b, c, and d illustrated in FIG. 2 and the phases of the portions of the light flux that pass through the areas b, c, and d are respectively advanced by 90 degrees, 270 degrees, and 180 degrees with respect to the phase of the portion of the light flux that passes through the area a. Alternatively, the phases of the portions of the light flux that pass through the areas b, c, and d may be respectively retarded by 90 degrees, 270 degrees, and 180 degrees with respect to the phase of the portion of the light flux that passes through the area a.

In FIG. 2, the phase plate 12 is divided into four areas, but may be divided into any number of areas.

The light detecting element 15 only has to include at least four photoreceptive surfaces. More photoreceptive surfaces may be provided as long as the number of photoreceptive surfaces is the same as the number of divisions of the phase plate 12.

In FIG. 2, the borders between the divisions of the phase plate are continuous. Thus, signal crosstalk may occur as a result of neighboring interfering light beams entering adjacent photoreceptive surfaces of the light detecting element 15. To address this, a shielding region may be provided at a border portion on the phase plate 12 or the light detecting element 15 to exclude interfering light beams around the border portion and minimize crosstalk.

Modified Example of First Embodiment

The scanning optical microscope according to the embodiment obtains an image of a sample using light reflected off the sample. This is not the only way of obtaining an image of a sample, however. For example, as in the case of a widely used biological microscope, the scanning optical microscope may be a transmission-mode scanning optical microscope that obtains a transmission image of a sample using light that has passed through the sample.

Figure 4:
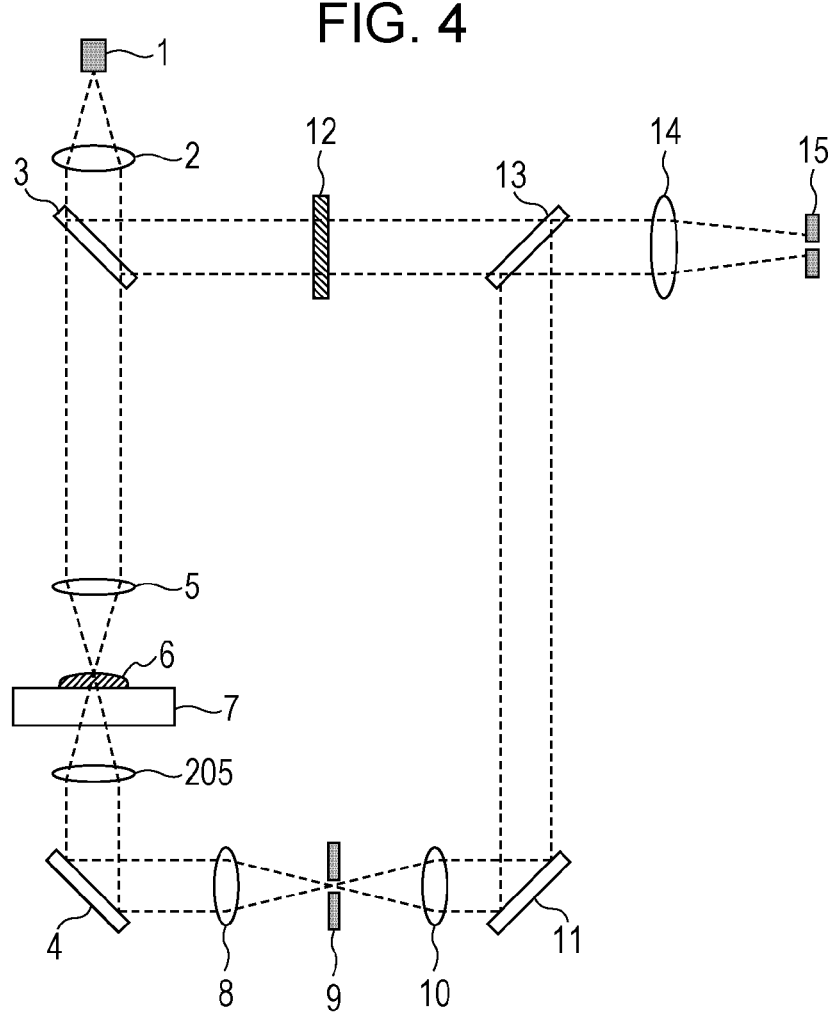
FIG. 4 illustrates the entire configuration of an optical system of the scanning optical microscope according to the first embodiment of the disclosure.

FIG. 4 illustrates a specific example of the configuration of a transmission-mode scanning optical microscope.

As illustrated in FIG. 4, signal light converged on the convergence spot on the sample 6 is transmitted through the sample 6 and collimated by the second objective lens 205 into parallel light. Then, the light is converged again by the first lens 8, transmitted through the pin hole 9 positioned at the converged point of the first lens 8, and collimated again by the second lens 10 into parallel light.

An actuator, not illustrated, may be provided to drive the first objective lens 5 or the second objective lens 205 in the direction of the optical axis of the first objective lens 5 or the second objective lens 205.

In this case, while the sample remains stationary, for example, vertical images of a sample can be combined by detecting the reflectance or the transmittance of the sample as a result of scanning the sample 6 with a minute spot while the spot is moved by the actuator of the first objective lens 5 or the second objective lens 205 in the direction of the optical axis.

The signal light collimated by the second lens 10 into parallel light and the reference light are multiplexed by the optical multiplexing element 13. Then, as in the case of the first embodiment illustrated in FIG. 1, the interfering light formed by multiplexing the reference light and the signal light is received by the light detecting element 15.

Alternatively, the optical systems illustrated in FIG. 1 and FIG. 4 may be combined to obtain a reflected image and a transmitted image and obtain an image in which these images are combined with signal processing.

Second Embodiment

Figure 5:
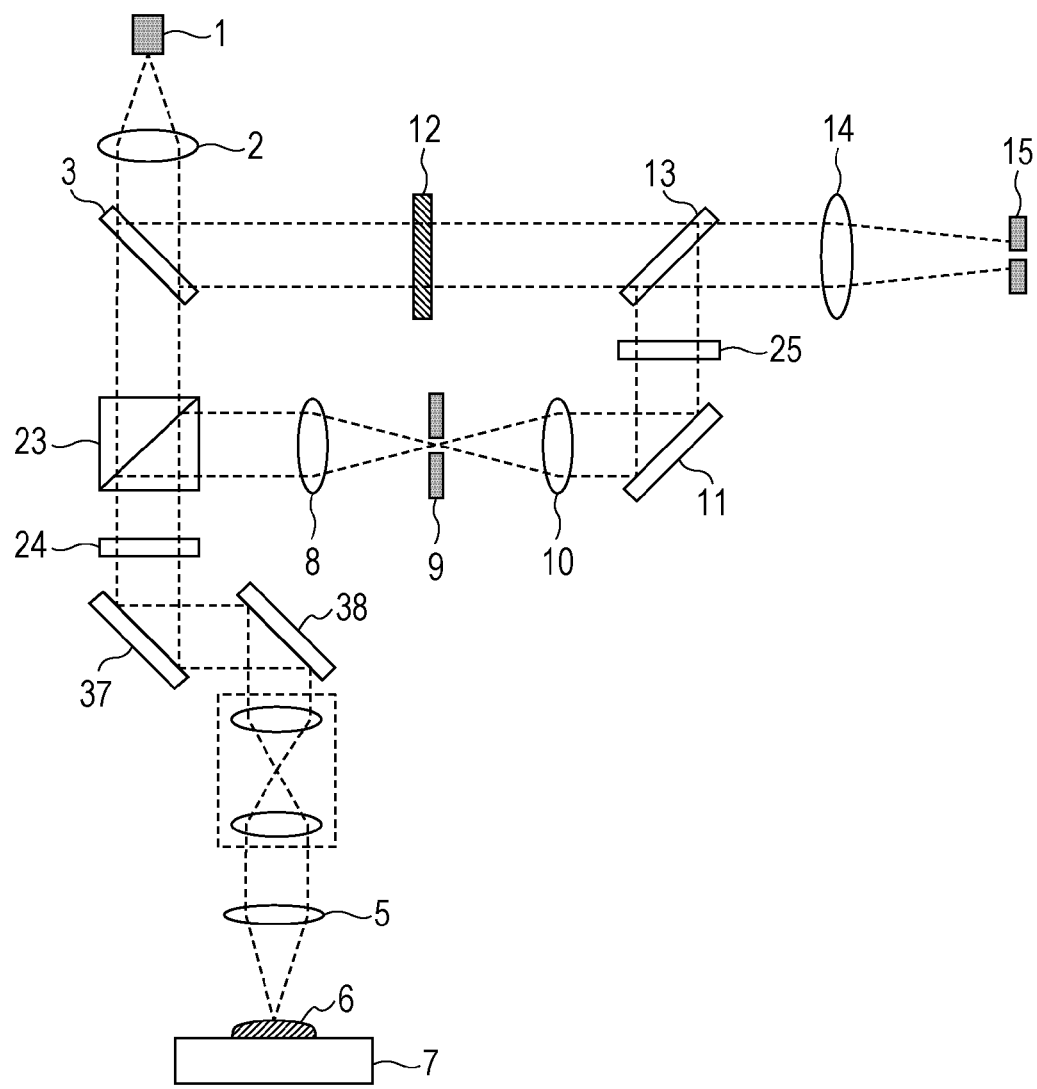
FIG. 5 illustrates the entire configuration of an optical system of a scanning optical microscope according to a second embodiment of the disclosure.

FIG. 5 illustrates the configuration of an example of the scanning optical microscope according to a second embodiment of the disclosure.

Unlike the configuration illustrated in FIG. 1, the configuration illustrated in FIG. 5 includes a first polarizing mirror 37 and a second polarizing mirror 38 having rotation axes that extend so as to be perpendicular to each other. Scanning is performed with light in two directions perpendicular to the optical axis of irradiation light, so that the sample 6 is two-dimensionally scanned at the convergence-spot position of the first objective lens 5 to obtain a reflected image of the sample 6.

The configuration illustrated in FIG. 5 also includes a first polarization beam splitter 23 and a quarter-wavelength plate 24, so that the configuration forms an optical isolator optical system that prevents signal light from returning to the laser light source.

Specifically, the first polarization beam splitter 23 is disposed in such a manner as to increase the transmittance of light polarized in the same manner as light from the laser light source 1 and increase the reflectance of light polarized so as to be perpendicular to light from the laser light source 1. The signal light that has passed through the quarter-wavelength plate 24 from both sides of the quarter-wavelength plate 24 is polarized at 90 degrees. Thus, the signal light does not return to the laser and is reflected toward the pin hole. Consequently, the configuration illustrated in FIG. 5 can improve the light transmission efficiency compared to the configuration illustrated in FIG. 1.

Light, however, does not interfere with perpendicularly polarized light. Thus, a half-wavelength plate 25 is provided to polarize the signal light by another 90 degrees before the signal light is incident on the optical multiplexing element 13, so that the polarization state of the signal light is returned so as to be the same as the polarization state of the reference light.

In this embodiment, scanning with a laser beam is performed by driving a polarizing mirror. However, this is not the only possible way. Optical scanning may be performed in any method as long as the scanning can be performed at high speed and with which a reflected image and a transmitted image of the sample can be immediately obtained.

Examples of elements that perform scanning with laser beams include an acousto-optic deflection element, an electro-optic deflection element, a polygon mirror, and an actuator for micro electro mechanical systems (MEMS).

Other components are similar to those in the first embodiment of the disclosure.

Third Embodiment

Figure 6:
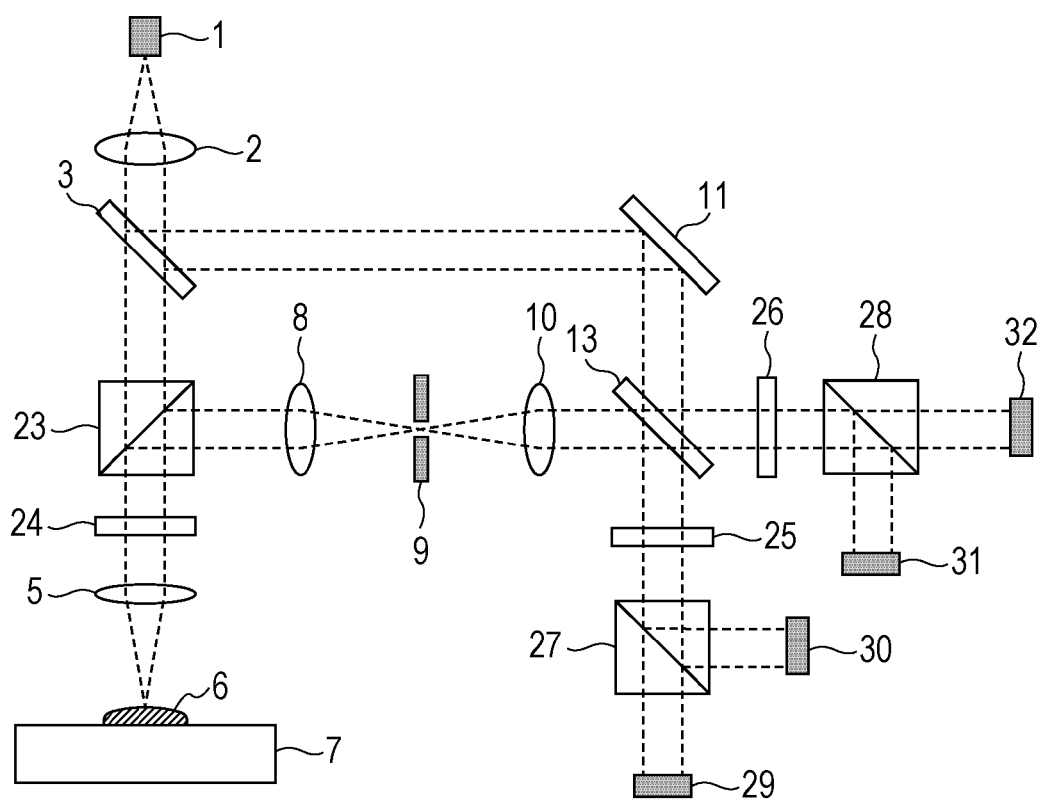
FIG. 6 illustrates the entire configuration of an optical system of a scanning optical microscope according to a third embodiment of the disclosure.

FIG. 6 illustrates the configuration of an example of a scanning optical microscope according to a third embodiment of the disclosure.

In the first embodiment, the phase plate 12 is used to generate four beams of interfering light having phases different by 90 degrees from one another as expressed in Expression (1) to Expression (4). In the third embodiment, on the other hand, a polarization beam splitter and a wavelength plate are combined to generate four beams of interfering light having phases different by 90 degrees from one another. Referring now to FIG. 6, an operation of a scanning optical microscope according to the third embodiment of the disclosure will be described.

As illustrated in FIG. 6, light emitted from the laser light source 1 is collimated by the collimation lens 2 into parallel light and then divided into irradiation light that is transmitted through the first beam splitter 3 and reference light that is reflected off the first beam splitter 3.

The irradiation light is applied to the sample 6 by the first objective lens 5 and forms a convergence spot.

Signal light reflected at the convergence spot on the sample 6 is reflected by the first polarization beam splitter 23 and converged by the first lens 8. The signal light is then transmitted through the pin hole 9 positioned at the converged point and collimated again by the second lens 10 into parallel light.

Here, the first polarization beam splitter 23 transmits light polarized in the same direction as light from the laser light source 1 and reflects light polarized in the direction perpendicular to light from the laser light source 1.

The crystallographic axis of the quarter-wavelength plate 24 is inclined at 45 degrees with respect to the direction in which light from the laser light source 1 is polarized. The signal light that has emerged from the quarter-wavelength plate 24 is polarized at 90 degrees with respect to light that is emitted from the laser light source 1 and that enters the quarter-wavelength plate 24. The signal light that has emerged from the quarter-wavelength plate 24 is reflected by the first polarization beam splitter 23.

The signal light collimated by the second lens 10 into parallel light and the reference light are multiplexed by the optical multiplexing element 13. The light flux obtained by multiplexing the signal light and the reference light is divided into a first light flux that is to be guided to a half-wavelength plate 25 and a second light flux that is to be guided to a quarter-wavelength plate 26.

Each of the first light flux and the second light flux is obtained by multiplexing the reference light and the signal light. Here, the reference light and the signal light are perpendicular to each other and thus do not interfere with each other. The polarization directions of the first light flux and the second light flux are changed using the half-wavelength plate 25 and the quarter-wavelength plate 26 and the first light flux and the second light flux are polarized with respect to each other and separated from each other using a second polarization beam splitter 27 and a third polarization beam splitter 28. Thus, four beams of interfering light having different phases are generated.

The above-described principle will be described with reference to FIG. 6 and some mathematical expressions.

In FIG. 6, the direction toward the plane of FIG. 6 is defined as a -y direction.

The direction perpendicular to the y direction and the directions of the optical axes of the first and second light fluxes is defined as an x direction.

In FIG. 6, the optical system is arranged in such a manner that the first light flux has only a signal light component having an electric field amplitude of ½ $E_s$ in the x direction and that the second light flux has only a reference light component having an electric field amplitude of ½ $E_r$ in the y direction. When the splitting ratio of the optical multiplexing element 13 is assumed to be 1:1, the electric field vectors of the first and second light fluxes are both expressed in the following expression.

$$\begin{bmatrix} E_x \\ E_y \end{bmatrix} = \begin{bmatrix} \frac{1}{2}E_s \\ \frac{1}{2}E_r \end{bmatrix} \tag{10}$$

Here, $E_x$ denotes an x component of the electric field vector and $E_y$ denotes a y component of the electric field vector.

Firstly, the first light flux is described. The half-wavelength plate 25 is disposed with its crystallographic axis being inclined at 22.5 degrees with respect to the y axis. The electric field vector of the first light flux that has passed through the half-wavelength plate 25 is obtained by solving Jones matrices expressed in Expression (11).

$$\begin{bmatrix} E_x \\ E_y \end{bmatrix} = \frac{1}{\sqrt{2}} \begin{bmatrix} 1 & 1 \\ 1 & -1 \end{bmatrix} \begin{bmatrix} \frac{1}{2}E_s \\ \frac{1}{2}E_r \end{bmatrix} \tag{11}$$

The intensity of light in the x and y directions is proportional to the square of the electric field vector. Thus, when the absolute values of the electric field vector components $E_x$ and $E_y$ are squared using Expression (11), the values are expressed by Expression (12) and Expression (13) as follows.

$$|E_x|^2 = \frac{1}{8}\{|E_r|^2 + |E_s|^2 + 2|E_s||E_r|\cos(\Phi)\} \tag{12}$$

$$|E_y|^2 = \frac{1}{8}\{|E_r|^2 + |E_s|^2 + 2|E_s||E_r|\cos(\Phi + \pi)\} \tag{13}$$

Here, 0 is the phase of the interfering light beam expressed in Expression (12) and determined by the difference in length between the optical paths of the signal light and the reference light from the light source.

Similarly, the second light flux is described. The quarter-wavelength plate 26 is disposed with its crystallographic axis being inclined at 45 degrees with respect to the y axis. The electric field vector of the second light flux that has passed through the quarter-wavelength plate 26 is obtained by solving Jones matrices expressed in Expression (14) as follows.

$$\begin{bmatrix} E_x \\ E_y \end{bmatrix} = \frac{1}{\sqrt{2}} \begin{bmatrix} 1 & i \\ i & 1 \end{bmatrix} \begin{bmatrix} \frac{1}{2}E_s \\ \frac{1}{2}E_r \end{bmatrix} \quad (14)$$

Here, i denotes an imaginary unit and i×i=−1.

The intensity of light in the x and y directions is proportional to the square of the electric field vector. Thus, when the absolute values of the electric field vector components $E_x$ and $E_y$ are squared using Expression (11), the values are expressed by Expression (15) and Expression (16) as follows.

$$|E_x|^2 = \frac{1}{8}\left\{|E_r|^2 + |E_s|^2 + 2|E_s||E_r|\cos\left(\Phi + \frac{1}{2}\pi\right)\right\} \quad (15)$$

$$|E_y|^2 = \frac{1}{8}\left\{|E_r|^2 + |E_s|^2 + 2|E_s||E_r|\cos\left(\Phi + \frac{3}{2}\pi\right)\right\} \quad (16)$$

Expression (12) and Expression (15) are used for calculations of an interfering light beam having polarization of an x direction component, while Expression (13) and Expression (16) are used for calculations of an interfering light beam having polarization of a y direction component. Thus, as illustrated in FIG. 6, a polarization beam splitter that transmits light polarized in the x direction and reflects light polarized in the y direction is used, so that interfering light beams polarized in different directions can be separated from each other.

Specifically, as illustrated in FIG. 6, the interfering light is split into four beams by a second polarization beam splitter 27 and a third polarization beam splitter 28. The four beams are respectively received by a first light-receiving element 29, a second light-receiving element 30, a third light-receiving element 31, and a fourth light-receiving element 32.

Although the square of the electric field amplitude is proportional to the light intensity, for the sake of simplicity, a constant of proportionality is defined as one, $Er^2$ is defined as $I_r$, and $Es^2$ is defined as $I_s$. Finally, Expression (12), Expression (13), Expression (15), and Expression (16) respectively coincide with Expression (1), Expression (2), Expression (3), and Expression (4), as follows.

$$I_1 = \frac{1}{8}\{I_s + I_r + 2\sqrt{I_s I_r}\cos(\Phi)\} \quad (17)$$

$$I_2 = \frac{1}{8}\left\{I_s + I_r + 2\sqrt{I_s I_r}\cos\left(\Phi + \frac{1}{2}\pi\right)\right\} \quad (18)$$

$$I_3 = \frac{1}{8}\{I_s + I_r + 2\sqrt{I_s I_r}\cos(\Phi + \pi)\} \quad (19)$$

-continued $$I_4 = \frac{1}{8}\left\{I_s + I_r + 2\sqrt{I_s I_r}\cos\left(\Phi + \frac{3}{2}\pi\right)\right\} \quad (20)$$

Thus, by processing output signals from the first light-receiving element 29, the second light-receiving element 30, the third light-receiving element 31, and the fourth light-receiving element 32 in the same manner as in the case of the first embodiment, a reflected image of a low-reflectance sample can be highly sensitively detected.

In this embodiment, the second polarization beam splitter 27 and the third polarization beam splitter 28 are used for polarizing the first and second light fluxes in different directions and separating the first and second light fluxes from each other. Alternatively, other optical elements that can separate light beams polarized in different directions from each other, such as a diffraction grating or a prism, may be used.

Modified Example of Third Embodiment

The scanning optical microscope according to the third embodiment obtains an image of a sample using light reflected off the sample. However, the method of obtaining an image of a sample is not limited to this. As in the case of the first embodiment, the scanning optical microscope may be a transmission-mode scanning optical microscope that obtains a transmitted image of a sample using light that has passed through the sample.

Figure 7:
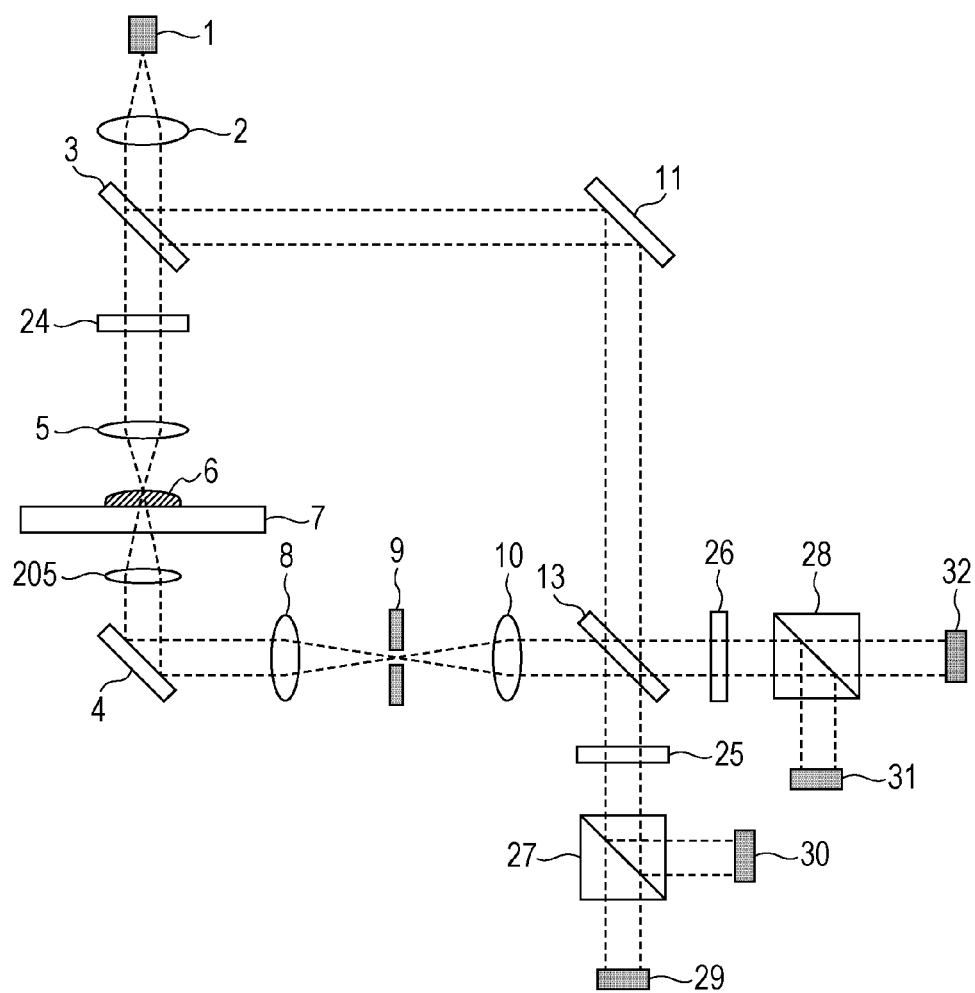
FIG. 7 illustrates the entire configuration of an optical system of a scanning optical microscope according to a modified example of the third embodiment of the disclosure.

As a specific example, FIG. 7 illustrates the configuration of a transmission-mode scanning optical microscope.

As illustrated in FIG. 7, signal light that has converged on the convergence spot on the sample 6 is transmitted through the sample 6 and collimated by the second objective lens 205 into parallel light. Then, the light is converged again by the first lens 8, transmitted through the pin hole 9 positioned at the converged point of the first lens 8, and collimated again by the second lens 10 into parallel light.

The signal light collimated by the second lens 10 into parallel light and the reference light are multiplexed by the optical multiplexing element 13. The multiplexed light is split into two light beams and signals obtained from the first light-receiving element 29, the second light-receiving element 30, the third light-receiving element 31, and the fourth light-receiving element 32 are processed in the same manner as in the case of the third embodiment illustrated in FIG. 6. Thus, image information of a transmitted image of the sample 6 can be obtained.

Figure 8:
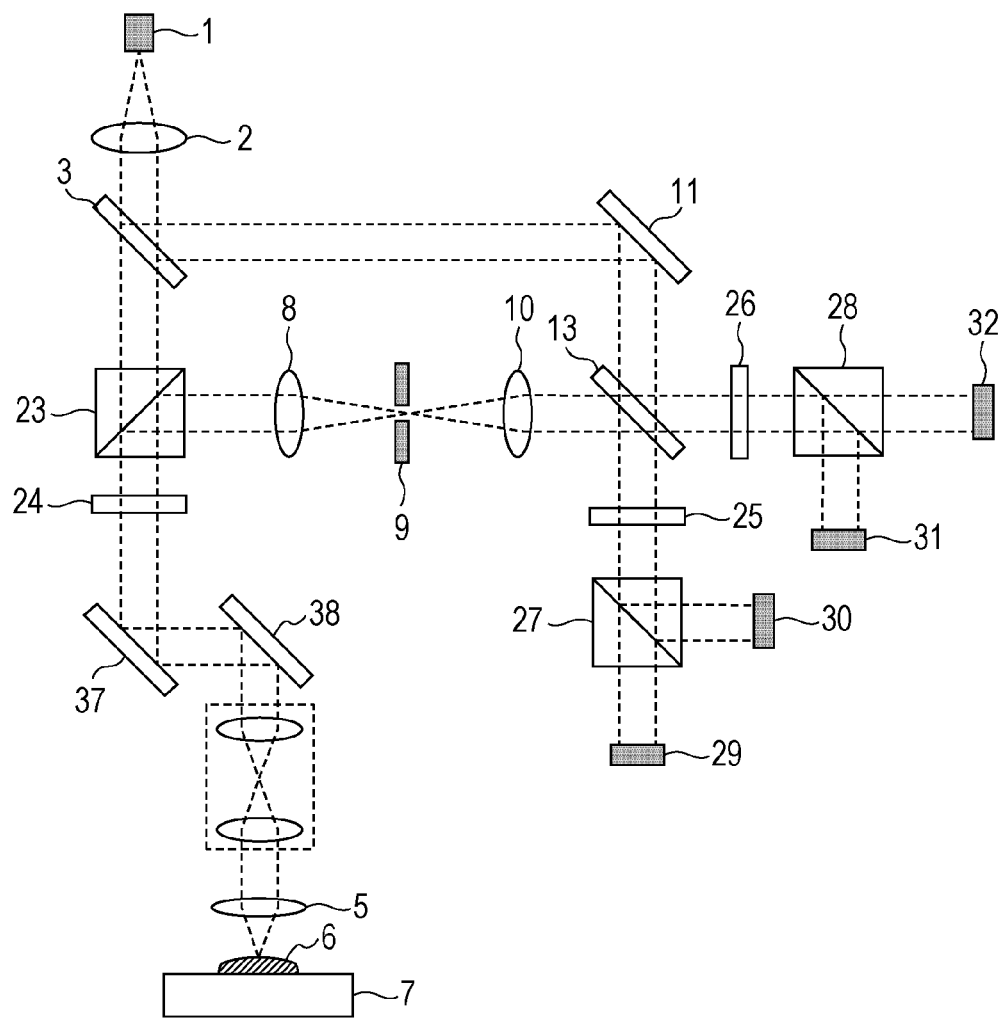
FIG. 8 illustrates the entire configuration of an optical system of a scanning optical microscope according to a modified example of the third embodiment of the disclosure.

In some embodiments, an image of a sample is obtained by obtaining electric signals of the third signal arithmetic unit 22 using a scanning device, not illustrated, while the sample stage 7 is being horizontally moved. Alternatively, as illustrated in FIG. 8, a first polarizing mirror 37 and a second polarizing mirror 38, whose rotation axes are perpendicular to each other, may be used to two-dimensionally scan a sample 6 at the convergence spot of the first objective lens 5 with irradiation light in two directions that are perpendicular to the optical axis of the irradiation light so as to obtain a reflected image of the sample 6.

Other part of the configuration is similar to that of the first and second embodiments of the disclosure.

Fourth Embodiment

Figure 9:
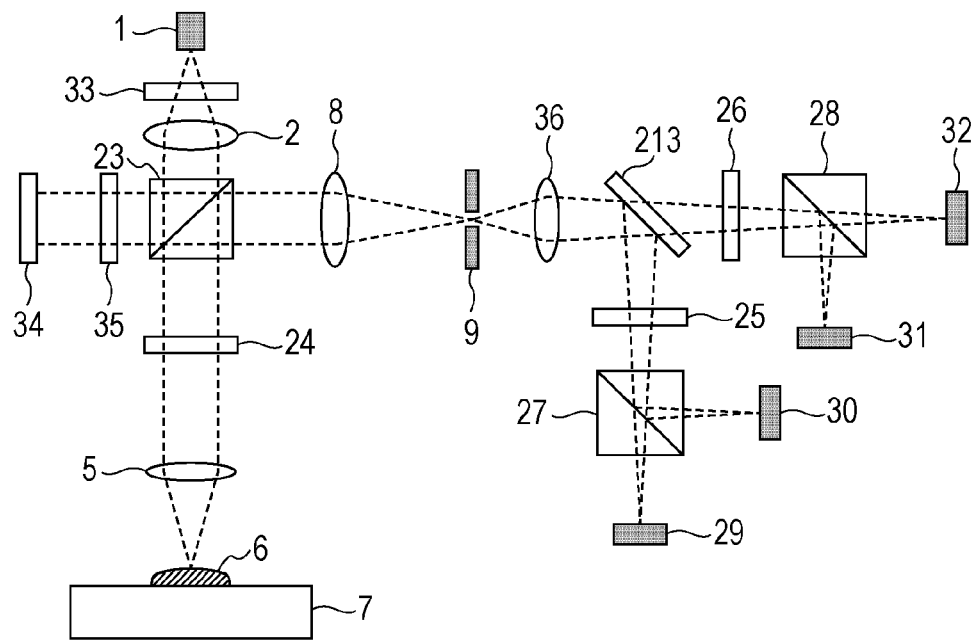
FIG. 9 illustrates the entire configuration of an optical system of a scanning optical microscope according to a fourth embodiment of the disclosure.

FIG. 9 illustrates the configuration of an example of a scanning optical microscope according to a fourth embodiment of the disclosure.

The interference optical system according to the third embodiment has an optical configuration to which a Mach-Zehnder interferometer is applied. FIG. 9, on the other hand, illustrates a configuration according to the fourth embodiment based on a Michelson interferometer unlike the interferometer according to the third embodiment.

Referring now to FIG. 9, the fourth embodiment is described below.

In the configuration illustrated in FIG. 6, the first beam splitter 3 is used to obtain the second reference light beam. In the configuration illustrated in FIG. 9, on the other hand, the method for splitting the reference light is different from that in the case illustrated in FIG. 6.

Light emitted from the laser light source 1 is polarized by a half-wavelength plate 33 so as to be inclined at 45 degrees. Light having the same polarization component as light from the laser light source 1 is transmitted through the first polarization beam splitter 23 and light having a polarization component perpendicular to light from the laser light source 1 is reflected by the first polarization beam splitter 23.

Here, the first polarization beam splitter 23 transmits light polarized in the same direction as light from the laser light source 1 and reflects light polarized in the direction perpendicular to light from the laser light source 1.

The light reflected off the first polarization beam splitter 23 serves as reference light. The light is reflected off the reflecting mirror 34 and enters again the first polarization beam splitter 23 as reference light.

The light transmitted through the first polarization beam splitter 23 is converged on the sample 6 by the first objective lens 5. Light reflected off the sample 6 is received by the first objective lens 5 and enters again the first polarization beam splitter 23 as signal light.

The reference light and the signal light are respectively polarized at 90 degrees by being transmitted through the quarter-wavelength plate 35 and the quarter-wavelength plate 24 from opposite directions in a reciprocating manner. The signal light is reflected off the first polarization beam splitter 23, whereas the reference light reflected off the reflecting mirror 34 is transmitted through the first polarization beam splitter 23.

The reference light and the signal light that have emerged from the polarization beam splitter 23 are converged by the first lens 8 and transmitted through the pin hole 9 positioned at the converged point of the first lens 8. Then, the converged light is transmitted through an imaging lens 36 and is incident on an optical splitting element 213.

The light beams that have been transmitted through or reflected by the splitting element 213 behave the same way as in the case of the third embodiment. Thus, a reflected image of a sample 6 can be obtained by the same optical system as that illustrated in FIG. 6 and by the same principle.

In the configuration according to this embodiment, the reference light is also transmitted through the pin hole 9, as illustrated in FIG. 9, whereby an aberration component or noise light included in the reference light can be excluded at the pin hole 9. Thus, the coherence of the reference light can be further improved.

Figure 10:
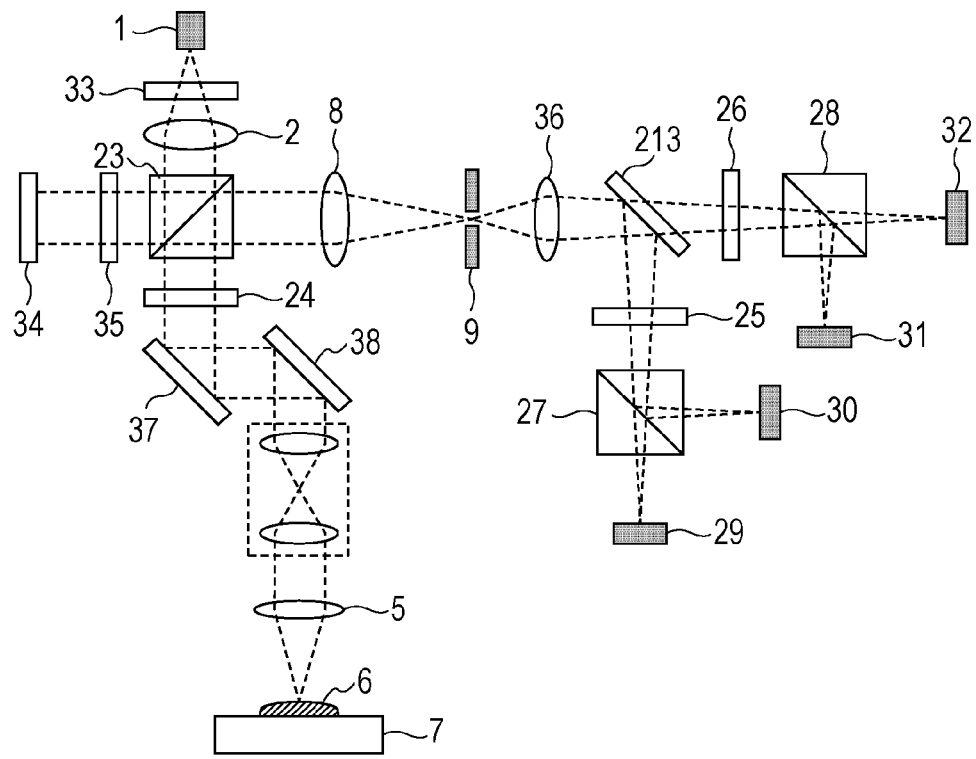
FIG. 10 illustrates the entire configuration of an optical system of a scanning optical microscope according to a modified example of the fourth embodiment of the disclosure.

Here, a scanning optical system as illustrated in FIG. 10 may be additionally provided as in the case of the configuration of FIG. 8.

Other part of the configuration is similar to that according to the first to third embodiments of the disclosure.

INDUSTRIAL APPLICABILITY

A scanning optical microscope disclosed herein is capable of amplifying signal light by causing reference light to interfere with signal light and thus highly sensitively detecting signals. The scanning optical microscope is thus usable as a scanning optical microscope used for the purposes of highly sensitively obtaining faint signal light from a sample having a low reflectance or transmittance or a sample, such as a living cell, to which strong measurement light is not allowed to be applied, for example, medical cytodiagnosis or observations of living samples.

CROSS REFERENCE TO RELATED APPLICATION

The present application claims the benefit of Japanese Patent Application No. 2013-213431 filed on Oct. 11, 2013. The entire disclosure of the above-identified application, including the specification, drawings and claims, is incorporated herein by reference in its entirety.

What is claimed is:

1. A scanning optical microscope, comprising:
   a light source;
   a first beam splitter configured to split light emitted from the light source into irradiation light and reference light;
   a first objective lens configured to converge the irradiation light on a sample and receive signal light, which occurs as a result of reflecting the converged light off the sample;
   a second beam splitter configured to split the signal light off from an optical path extending between the light source and the sample;
   a pin hole positioned on an optical path of the split signal light at a position optically conjugate with an image-forming point of the first objective lens;
   a condenser lens configured to converge the split signal light on the pin hole;
   a phase plate configured to output first light including at least four firstly-split light beams having different phases;
   a third beam splitter configured to multiplex the first light and second light to generate interfering light including at least four secondly-split light beams having different phases; and
   a light detecting element configured to receive the interfering light and output at least four electric signals,
   wherein the at least four firstly-split light beams correspond to the at least four secondly-split light beams,
   wherein intensities of the at least four electric signals correspond one to one to intensities of the at least four secondly-split light beams,
   wherein a first phase plate or a second phase plate is used as the phase plate,
   wherein, when the first phase plate is used as the phase plate, the reference light enters the first phase plate and the signal light that has passed through the pin hole serves as the second light, and
   wherein, when the second phase plate is used as the phase plate, the signal light that has passed through the pin hole enters the second phase plate and the reference light serves as the second light.

2. The scanning optical microscope according to claim 1, wherein the at least four firstly-split light beams includes
   i) a first split light beam that has passed through a first split area;
   ii) a second split light beam that has passed through a second split area and that has a phase shifted by 90 degrees from a phase of the first split light beam;

iii) a third split light beam that has passed through a third split area and that has a phase shifted by 180 degrees from the phase of the first split light beam; and iv) a fourth split light beam that has passed through a fourth split area and that has a phase shifted by 270 degrees from the phase of the first split light beam.

3. The scanning optical microscope according to claim 2, wherein the light detecting element includes i) a first photoreceptive surface configured to receive a first interfering light beam corresponding to the first split light beam, ii) a second photoreceptive surface configured to receive a second interfering light beam corresponding to the second split light beam, iii) a third photoreceptive surface configured to receive a third interfering light beam corresponding to the third split light beam, and iv) a fourth photoreceptive surface configured to receive a fourth interfering light beam corresponding to the fourth split light beam, and wherein the at least four secondly-split light beams includes the first interfering light, the second interfering light, the third interfering light, and the fourth interfering light.

4. The scanning optical microscope according to claim 3, wherein the light detecting element has the first photoreceptive surface, the second photoreceptive surface, the third photoreceptive surface, and the fourth photoreceptive surface on the same plane.

5. The scanning optical microscope according to claim 3, further comprising:

a first signal processor configured to obtain a difference between a signal value output from the first photoreceptive surface and a signal value output from the third photoreceptive surface;

a second signal processor configured to obtain a difference between a signal value output from the second photoreceptive surface and a signal value output from the fourth photoreceptive surface; and a third signal processor configured to output a square root of a sum of squares of a signal value output from the first signal processor and a signal value output from the second signal processor.

6. The scanning optical microscope according to claim 1, further comprising a spot scanning device configured to scan the sample with a microscopic spot.

7. The scanning optical microscope according to claim 6, wherein the spot scanning device is a motorized stage, and wherein image information of the sample is obtained by changing relative positions of the sample and the microscopic spot as a result of the motorized stage two-dimensionally or three-dimensionally moving the sample.

8. The scanning optical microscope according to claim 7, wherein the spot scanning device is any one of a galvanometer scanner, an acousto-optic element, and an electro-optic element, and wherein image information of the sample is obtained by two-dimensionally scanning the sample with the microscopic spot as a result of changing an inclination of an optical axis of the irradiation light.

9. The scanning optical microscope according to claim 1, wherein the light source is any one of a laser, a super luminescent diode, a light emitting diode, and a halogen lamp.

10. A scanning optical microscope, comprising:

a light source;

a first beam splitter configured to split light emitted from the light source into irradiation light and reference light;

a first objective lens configured to converge the irradiation light on a sample;

a second objective lens configured to receive signal light that has been converged on the sample and transmitted through the sample;

a second beam transmitter configured to change an optical path of the signal light;

a pin hole positioned on the changed optical path of the signal light at a position optically conjugate with an image-forming point of the first objective lens;

a condenser lens configured to converge the signal light, whose optical path has been changed, on the pin hole;

a phase plate configured to output first light including at least four firstly-split light beams having different phases;

a third beam splitter configured to multiplex the first light and second light to generate interfering light including at least four secondly-split light beams having different phases; and a light detecting element configured to receive the interfering light and output at least four electric signals, wherein the at least four firstly-split light beams correspond to the at least four secondly-split light beams, wherein the intensities of the at least four electric signals correspond one to one to intensities of the at least four secondly-split light beams, wherein a first phase plate or a second phase plate is used as the phase plate, wherein, when the first phase plate is used as the phase plate, the reference light enters the first phase plate and the signal light that has passed through the pin hole serves as the second light, and wherein, when the second phase plate is used as the phase plate, the signal light that has passed through the pin hole enters the second phase plate and the reference light serves as the second light.

11. The scanning optical microscope according to claim 6, wherein the phase plate outputs the first light after splitting the first light into i) a first split light beam that has passed through a first split area;

ii) a second split light beam that has passed through a second split area and that has a phase shifted by 90 degrees from a phase of the first split light beam;

iii) a third split light beam that has passed through a third split area and that has a phase shifted by 180 degrees from the phase of the first split light beam; and iv) a fourth split light beam that has passed through a fourth split area and that has a phase shifted by 270 degrees from the phase of the first split light beam.

12. The scanning optical microscope according to claim 11, wherein the light detecting element includes i) a first photoreceptive surface configured to receive a first interfering light beam corresponding to the first split light beam, ii) a second photoreceptive surface configured to receive a second interfering light beam corresponding to the second split light beam, iii) a third photoreceptive surface configured to receive a third interfering light beam corresponding to the third split light beam, and iv) a fourth photoreceptive surface configured to receive a fourth interfering light beam corresponding to the fourth split light beam, and wherein the at least four secondly-split light beams includes the first interfering light, the second interfering light, the third interfering light, and the fourth interfering light.

13. The scanning optical microscope according to claim 12, wherein the light detecting element has the first photoreceptive surface, the second photoreceptive surface, the third photoreceptive surface, and the fourth photoreceptive surface on the same plane.

14. The scanning optical microscope according to claim 13, further comprising:
- a first signal processor configured to obtain a difference between a signal value output from the first photoreceptive surface and a signal value output from the third photoreceptive surface;
- a second signal processor configured to obtain a difference between a signal value output from the second photoreceptive surface and a signal value output from the fourth photoreceptive surface; and
- a third signal processor configured to output a square root of a sum of squares of a signal value output from the first signal processor and a signal value output from the second signal processor.

15. A scanning optical microscope, comprising:
- a light source;
- a first beam splitter configured to split light emitted from the light source into irradiation light and reference light;
- a first objective lens configured to converge the irradiation light on a sample and receive signal light, which occurs as a result of reflecting the converged light off the sample;
- a second beam splitter configured to split the signal light off from an optical path extending between the light source and the sample;
- a pin hole positioned on an optical path of the split signal light at a position optically conjugate with an image-forming point of the first objective lens;
- a condenser lens configured to converge the split signal light on the pin hole;
- an optical splitting element configured to multiplex the split signal light that has passed through the pin hole and the reference light, and split the multiplexed light into a first light flux and a second light flux;
- a half-wavelength plate configured to change a direction of polarization of the first light flux;
- a first polarization beam splitter configured to split the first light flux that has passed through the half-wavelength plate into a first interfering light beam and a third interfering light beam having a phase shifted by 180 degrees with respect to a phase of the first interfering light beam;
- a quarter-wavelength plate configured to change a direction of polarization of the second light flux;
- a second polarization beam splitter configured to split the second light flux that has passed through the quarter-wavelength plate into a second interfering light beam, having a phase shifted by 90 degrees with respect to the phase of the first interfering light beam, and a fourth interfering light beam, having a phase shifted by 270 degrees with respect to the phase of the first interfering light beam;
- a first light detecting element configured to receive the first interfering light beam and output a first electric signal corresponding to the intensity of the first interfering light beam;
- a second light detecting element configured to receive the second interfering light beam and output a second electric signal corresponding to the intensity of the second interfering light beam;
- a third light detecting element configured to receive the third interfering light beam and output a third electric signal corresponding to the intensity of the third interfering light beam; and
- a fourth light detecting element configured to receive the fourth interfering light beam and output a fourth electric signal corresponding to the intensity of the fourth interfering light beam.

16. The scanning optical microscope according to claim 15, wherein the light detecting element includes
- i) a first photoreceptive surface configured to receive the first interfering light beam;
- ii) a second photoreceptive surface configured to receive the second interfering light beam;
- iii) a third photoreceptive surface configured to receive the third interfering light beam; and
- iv) a fourth photoreceptive surface configured to receive the fourth interfering light beam.

17. The scanning optical microscope according to claim 16, further comprising:
- a first signal processor configured to obtain a difference between a signal value output from the first photoreceptive surface and a signal value output from the third photoreceptive surface;
- a second signal processor configured to obtain a difference between a signal value output from the second photoreceptive surface and a signal value output from the fourth photoreceptive surface; and
- a third signal processor configured to output a square root of a sum of squares of a signal value output from the first signal processor and a signal value output from the second signal processor.

18. A scanning optical microscope, comprising:
- a light source;
- a first beam splitter configured to split light emitted from the light source into irradiation light and reference light;
- a first objective lens configured to converge the irradiation light on a sample;
- a second objective lens configured to receive signal light that has been converged on the sample and transmitted through the sample;
- a second beam splitter configured to change an optical path of the signal light that has passed through the second objective lens, the optical path extending between the light source and the sample;
- a pin hole positioned on the changed optical path of the signal light at a position optically conjugate with an image-forming point of the first objective lens;
- a condenser lens configured to converge the signal light, whose optical path has been changed, on the pin hole;
- an optical splitting element configured to multiplex the signal light that has passed through the pin hole and the reference light, and split the multiplexed light into a first light flux and a second light flux;
- a half-wavelength plate configured to change a direction of polarization of the first light flux;
- a first polarization beam splitter configured to split the first light flux that has passed through the half-wavelength plate into a first interfering light beam and a third interfering light beam having a phase shifted by 180 degrees with respect to a phase of the first interfering light beam;
- a quarter-wavelength plate configured to change a direction of polarization of the second light flux;
- a second polarization beam splitter configured to split the second light flux that has passed through the quarter-wavelength plate into a second interfering light beam, having a phase shifted by 90 degrees with respect to the phase of the first interfering light beam, and a fourth interfering light beam, having a phase shifted by 270 degrees with respect to the phase of the first interfering light beam;

a first light detecting element configured to receive the first interfering light beam and output a first electric signal corresponding to an intensity of the first interfering light beam;

a second light detecting element configured to receive the second interfering light beam and output a second electric signal corresponding to an intensity of the second interfering light beam;

a third light detecting element configured to receive the third interfering light beam and output a third electric signal corresponding to an intensity of the third interfering light beam; and a fourth light detecting element configured to receive the fourth interfering light beam and output a fourth electric signal corresponding to an intensity of the fourth interfering light beam.

19. The scanning optical microscope according to claim 18, wherein the light detecting element includes
    i) a first photoreceptive surface configured to receive the first interfering light beam;
    ii) a second photoreceptive surface configured to receive the second interfering light beam;
    iii) a third photoreceptive surface configured to receive the third interfering light beam; and
    iv) a fourth photoreceptive surface configured to receive the fourth interfering light beam.

20. The scanning optical microscope according to claim 19, further comprising:
    a first signal processor configured to obtain a difference between a signal value output from the first photoreceptive surface and a signal value output from the third photoreceptive surface;
    a second signal processor configured to obtain a difference between a signal value output from the second photoreceptive surface and a signal value output from the fourth photoreceptive surface; and
    a third signal processor configured to output a square root of a sum of squares of a signal value output from the first signal processor and a signal value output from the second signal processor.

21. A scanning optical microscope, comprising:
    a light source;
    a first objective lens configured to converge irradiation light emitted from the light source on a sample and receive signal light, which occurs as a result of reflecting the converged light off the sample;
    a beam splitter disposed on an optical path extending between the light source and the sample and configured to output reference light by splitting the irradiation light emitted from the light source off in a first direction and split the reflected signal light off in a second direction, which is opposite to the first direction;
    a reflection mirror configured to reflect the split reference light to cause the reflected split reference light to pass through the beam splitter and propagate in the second direction;
    a pin hole positioned on an optical path of the split signal light at a position optically conjugate with an image-forming point of the first objective lens;
    a condenser lens configured to converge the reflected split reference light and the split signal light on the pin hole;
    an optical splitting element configured to multiplex the reflected split reference light that has passed through the pin hole and the signal light that has passed through the pin hole, and split the multiplexed light into a first light flux and a second light flux;
    a half-wavelength plate configured to change a direction of polarization of the first light flux;
    a first polarization beam splitter configured to split the first light flux that has passed through the half-wavelength plate into a first interfering light beam and a third interfering light beam, having a phase shifted by 180 degrees with respect to a phase of the first interfering light beam;
    a quarter-wavelength plate configured to change a direction of polarization of the second light flux;
    a second polarization beam splitter configured to split the second light flux that has passed through the quarter-wavelength plate into a second interfering light beam, having a phase shifted by 90 degrees with respect to the phase of the first interfering light beam, and a fourth interfering light beam, having a phase shifted by 270 degrees with respect to the phase of the first interfering light beam;
    a first light detecting element configured to receive the first interfering light beam and output a first electric signal corresponding to an intensity of the first interfering light beam;
    a second light detecting element configured to receive the second interfering light beam and output a second electric signal corresponding to an intensity of the second interfering light beam;
    a third light detecting element configured to receive the third interfering light beam and output a third electric signal corresponding to an intensity of the third interfering light beam; and
    a fourth light detecting element configured to receive the fourth interfering light beam and output a fourth electric signal corresponding to an intensity of the fourth interfering light beam.

22. The scanning optical microscope according to claim 21, wherein the light detecting element includes
    i) a first photoreceptive surface configured to receive the first interfering light beam;
    ii) a second photoreceptive surface configured to receive the second interfering light beam;
    iii) a third photoreceptive surface configured to receive the third interfering light beam; and
    iv) a fourth photoreceptive surface configured to receive the fourth interfering light beam.

23. The scanning optical microscope according to claim 22, further comprising:
    a first signal processor configured to obtain a difference between a signal value output from the first photoreceptive surface and a signal value output from the third photoreceptive surface;
    a second signal processor configured to obtain a difference between a signal value output from the second photoreceptive surface and a signal value output from the fourth photoreceptive surface; and
    a third signal processor configured to output a square root of a sum of squares of a signal value output from the first signal processor and a signal value output from the second signal processor.

* * * * *